(12) United States Patent
Shah et al.

(10) Patent No.: US 9,445,332 B1
(45) Date of Patent: Sep. 13, 2016

(54) MANAGEMENT OF IDLE HANDOFF IN A WIRELESS COMMUNICATION SYSTEM

(75) Inventors: Maulik K. Shah, Overland Park, KS (US); Jasinder P. Singh, Olathe, KS (US); Sachin R. Vargantwar, Overland Park, KS (US); Siddharth S. Oroskar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 204 days.

(21) Appl. No.: 13/081,123

(22) Filed: Apr. 6, 2011

(51) Int. Cl.
*H04W 36/18* (2009.01)

(52) U.S. Cl.
CPC .................................... *H04W 36/18* (2013.01)

(58) Field of Classification Search
CPC ...................................................... H04W 36/18
USPC .................................. 455/436, 437; 370/331
See application file for complete search history.

(56) References Cited

U.S. PATENT DOCUMENTS

| | | | |
|---|---|---|---|
| 6,101,394 A | 8/2000 | Illidge | |
| 6,320,855 B1 * | 11/2001 | Shi | 370/332 |
| 8,254,967 B1 * | 8/2012 | Singh et al. | 455/458 |
| 2003/0036384 A1 * | 2/2003 | Chen et al. | 455/437 |
| 2003/0054820 A1 * | 3/2003 | Kang et al. | 455/434 |
| 2005/0037758 A1 * | 2/2005 | Rimoni | 455/436 |
| 2005/0164709 A1 | 7/2005 | Balasubramanian et al. | |
| 2008/0009288 A1 * | 1/2008 | Orfanos et al. | 455/436 |
| 2008/0274748 A1 * | 11/2008 | Lastinger et al. | 455/450 |
| 2009/0097448 A1 * | 4/2009 | Vasudevan et al. | 370/331 |
| 2009/0111468 A1 * | 4/2009 | Burgess et al. | 455/436 |
| 2009/0131046 A1 * | 5/2009 | Karabinis et al. | 455/427 |
| 2009/0154425 A1 | 6/2009 | Patil et al. | |
| 2009/0305699 A1 * | 12/2009 | Deshpande et al. | 455/434 |
| 2010/0260160 A1 * | 10/2010 | Wu | 370/342 |

OTHER PUBLICATIONS

U.S. Appl. No. 12/567,184, filed Sep. 25, 2009.
U.S. Appl. No. 12/567,198, filed Sep. 25, 2009.
TR45, "Upper Layer (Layer 3) Signaling Standard for cdma2000 Spread Spectrum Systems," PN-4431 to be published as TIA/EIA/IS-2000-5, Ballot Resolution Version 1.04a, Jul. 11, 1999.

* cited by examiner

*Primary Examiner* — Christopher M Brandt

(57) ABSTRACT

A method and apparatus for improved idle handoff a mobile station in a wireless communication system. While idling in a particular sector of the system, the mobile station will select a target sector based on a determination that the target sector has the same number of channels as the current sector, such as the same number of paging channels and perhaps the same number of frequency channels as the current sector. The mobile station will then engage in an idle handoff from the current sector to the selected target sector. By striving to hand off to a sector that has the same number of channels, particularly the same number of paging channels, the mobile station may avoid having to hash onto a channel in the target sector and may thereby minimize the likelihood of missing a page message sent while the mobile station was busy hashing onto the channel.

6 Claims, 3 Drawing Sheets

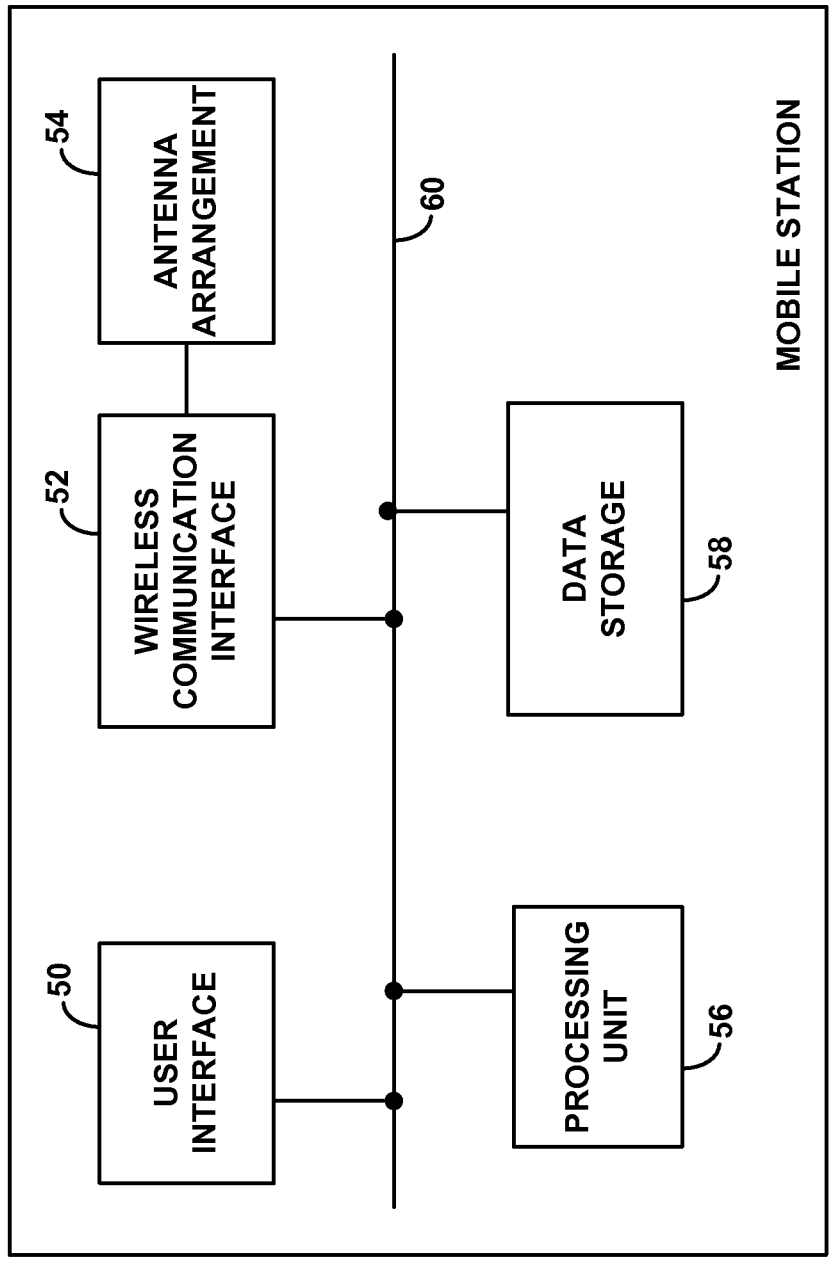

MANAGEMENT OF IDLE HANDOFF IN A WIRELESS COMMUNICATION SYSTEM

BACKGROUND

In a typical cellular wireless communication system, a radio access network (RAN) includes a plurality of base stations, each of which radiates to define one or more coverage areas (cell sectors) in which mobile stations served by the RAN can thereby obtain connectivity with broader networks such as the public switched telephone network (PSTN) and the Internet.

A RAN will typically communicate with served mobile stations according to an agreed air interface protocol, examples of which include CDMA (e.g., 1×RTT or 1×EV-DO), iDEN, WiMAX, LTE, GSM, HSDPA, and others now known or later developed. Communications in the direction from the RAN to mobile stations define a "forward link", while those in the direction from mobile stations to the RAN define a "reverse link".

Air interface communications in each sector may occur on one or more frequency channels. Further, on each frequency channel, the air interface in each sector may be divided into a number of channels for carrying bearer traffic (e.g., voice and other user data) and control data between the base station and served mobile stations. Depending on the wireless technology used, the air interface can be divided into these channels through code division multiplexing (with each channel defined by modulation with a specific code), time division multiplexing (with each channel defined as a segment of time), frequency division multiplexing (with each channel defined by modulation with a specific frequency), and/or some other mechanism.

In terms of control channels, for instance, on each frequency channel, the forward link of each sector may define a pilot channel on which the RAN broadcasts a pilot signal for use by mobile stations to detect and evaluate coverage of the sector, one or more broadcast channels on which the base station transmits system parameters for the sector, and one or more paging channels on which the base station may broadcast system information as well as page messages targeted to specific mobile stations. Further, the reverse link of each sector may define one or more access channels on which mobile stations can transmit requests to establish calls (e.g., voice calls or data communication sessions) and responses to control channel messages received from the base station.

As a mobile station moves about in such a system, the mobile station may evaluate pilot signals in order to identify a strongest sector in which the mobile station should operate. Once the mobile station has identified that sector, the mobile station may then operate in an "idle" mode (also known as "dormant" mode) in the sector. When idling in a sector, the mobile station is not actively engaged in a call, but the mobile station periodically monitors a paging channel in the sector to receive any relevant page messages.

To enable the RAN to know where to page an idle mobile station, the mobile station may transmit a registration message to the RAN each time the mobile station moves into a new sector. When a RAN seeks to connect a call or other communication to the mobile station, the RAN may then transmit a page message to the mobile station in the sector where the mobile station last registered.

Alternatively, groups of sectors in the RAN may be designated as discrete paging zones, and the RAN may broadcast in each sector a paging-zone ID indicating the sector's paging zone. When an idle mobile station moves from one sector to another, the mobile station may then determine based on the paging-zone ID whether the mobile station has moved into a new paging zone and if so may transmit a registration message to the RAN. When the RAN seeks to connect a call or other communication to the mobile station, the RAN may then transmit a page message to the mobile station in all of the coverage areas of the paging zone where the mobile station last registered.

As noted above, each sector in the RAN may operate on one or more frequency channels and, on each frequency channel, may define one or more paging channels. At issue when an idle mobile station enters a new sector may therefore be which paging channel the mobile station should monitor for page messages. Likewise, from the base station perspective, at issue may be which paging channel in a given sector the base station should use to page the mobile station.

OVERVIEW

One mechanism that can be used to determine which paging channel in a sector should be used for paging a mobile station is a hashing algorithm keyed to the mobile station's identifier. The hashing algorithm may take the form of a probability function that, when applied to a given mobile station's identifier, will produce an index value that can then be applied to a list of channels to indicate which channel should be used for that mobile station. This type of hashing algorithm can be applied to a list of frequency channels, in order to determine which frequency channel should be used for the mobile station, and to a list of paging channels, in order to determine which paging channel should be used for the mobile station.

For instance, a hashing algorithm applied to the mobile station's identifier may produce a value from 0 to 1. Assuming, by way of example, that there are three cardinally numbered frequency channels in the sector, a resulting value of 0 to 0.33 may then indicate that frequency channel 1 should be used, a resulting value of 0.34 to 0.66 may indicate that frequency channel 2 should be used, and a resulting value of 0.67 to 1.00 may indicate that frequency channel 3 should be used. Likewise, assuming that there are four cardinally numbered paging channels in the sector, a resulting value of 0 to 0.25 may then indicate that paging channel number 1 should be used, a resulting value of 0.26 to 0.50 may indicate that paging channel number 2 should be used, a resulting value of 0.51 to 0.75 may indicate that paging channel number 3 should be used, and a resulting value of 0.76 to 1.00 may indicate that paging channel number 4 should be used.

In practice, the base station may broadcast in the sector a list of frequency channels used in the sector (or a count of cardinally numbered frequency channels, which may effectively define a list of frequency channels), so that an idle mobile station entering the sector can determine which frequency channels are in use in the sector. Further, on each frequency channel, the base station may broadcast a list of paging channels used on that frequency channel (or a count of cardinally numbered paging channels, which may effectively define a list of paging channels), so that an idle mobile station entering the sector can determine which paging channels are in use on that frequency channel in the sector.

When the base station seeks to page an idle mobile station in that sector, the base station may then apply a predefined frequency channel hashing algorithm keyed to the mobile station's identifier in order to determine which frequency channel in the list should be used for paging the mobile station. Further, the base station may apply a predefined paging channel hashing algorithm (perhaps the same as the frequency channel hashing algorithm) to the mobile station's identifier (or may use the same hashing algorithm result already obtained, if appropriate) in order to determine which paging channel in the list for that frequency channel should be used for paging the mobile station. The base station may then transmit a page message to the mobile station in that sector on that paging channel.

Likewise, when an idle mobile station moves into that sector, the mobile station may read a frequency channel list message that is broadcast by the base station, to determine which frequency channels are in use in the sector, and the mobile station may then apply the same frequency channel hashing algorithm in order to determine which frequency channel to use. In turn, the mobile station may then read a paging channel list message that is broadcast by the base station on that frequency channel, to determine which paging channels are in use in the sector, and the mobile station may then apply the same paging channel hashing algorithm (or use the same result if appropriate) in order to determine which paging channel to use. The mobile station may then begin to monitor that paging channel for any applicable page messages.

Unfortunately, however, a problem with this process is that when an idle mobile station moves into a new sector, it may take the mobile station so long to hash onto a frequency channel and then a paging channel that the mobile station may miss a page message transmitted to the mobile station in that sector. In particular, while the mobile station is engaging in the hashing process to select a paging channel in the new sector, the base station of that sector may transmit a page message to the mobile station, but the mobile station may not receive the page message because the mobile station has not yet completed the hashing process and is thus not yet monitoring the paging channel in that sector.

Disclosed herein is a method to help overcome this problem. In accordance with the method, when a mobile station is idling in a sector (source sector) and is going to engage in an idle handoff to another sector (target sector), the mobile station will strive to select a target sector that has the same number of channels as the current sector. That way, the mobile station can minimize or avoid the hashing process in the target sector and can instead proceed directly to monitor the same paging channel in the target sector that the mobile station was monitoring in the source sector.

To carry out this method in practice, for instance, when the mobile station is operating in the source sector, the mobile station may receive from the base station of the source sector a neighbor list that lists potential target sectors and that includes respectively for each target sector a parameter specifying whether the target sector has the same number of channels as the source sector. The mobile station may limit its target sector selection to be from among those sectors that the neighbor list indicates have the same number of channels as the source sector.

The indication of whether the target sector has the same number of channels as the source sector may be with respect to paging channels, i.e., indicating that the target sector has the same number of paging channels as the source sector. Thus, in practice, the mobile station may strive to select a target sector that has the same number of paging channels as the source sector, so as to minimize or avoid the need apply a paging channel hashing algorithm for that target sector.

Alternatively or additionally, the indication of whether the target sector has the same number of channels as the source sector may be with respect to both frequency channels and paging channels, i.e., indicating that the target sector has the same number of frequency channels as the source sector and the same number of paging channels as the source sector. Thus, in practice, the mobile station may strive to select a target sector that has the same number of frequency channels as the source sector and the same number of paging channels as the source sector, so as to minimize or avoid the need to apply a frequency channel hashing algorithm or a paging channel hashing algorithm for the target sector. Still alternatively, the indication may be with respect to just frequency channels or with respect to some other channel or combination of channels.

These as well as other aspects, advantages, or alternatives will become apparent to those of ordinary skill in the art by reading the following detailed description, with reference where appropriate to the accompanying drawings. Further, it should be understood that the description provided by this overview section and elsewhere in this document is intended to explain and illustrate the invention by way of example only.

BRIEF DESCRIPTION OF THE DRAWINGS

FIG. 3 is a simplified block diagram of a mobile station operable in the exemplary method.

DETAILED DESCRIPTION

Figure 1:
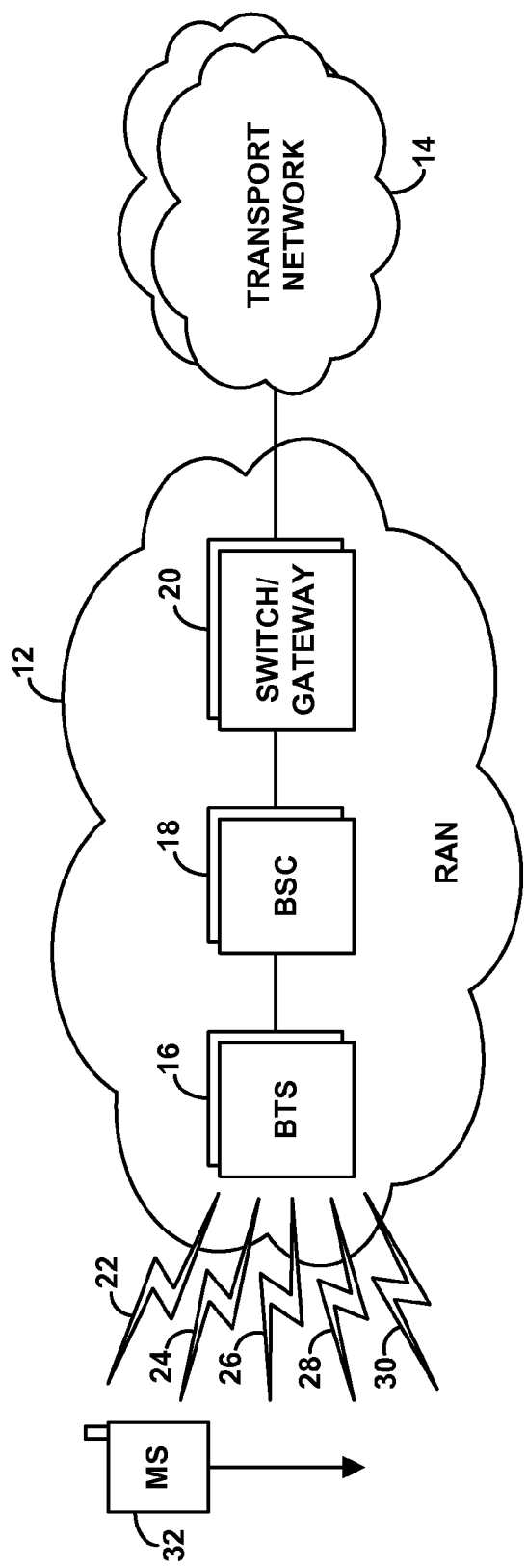
FIG. 1 is a simplified block diagram of a cellular wireless communication system in which an exemplary embodiment of the present method can be implemented.

The present method will now be described with reference to the figures. It should be understood, however, that numerous variations from the arrangement and functions shown are possible while remaining within the scope and spirit of the claims. For instance, elements may be added, removed, combined, distributed, substituted, re-positioned, re-ordered, or otherwise changed. Further, where this description refers to functions being carried out by an entity such as a mobile station or a base station (or other network component), it will be understood that the entity can carry out the functions by itself or with the assistance of other entities, and through application of hardware, firmware and/or software logic. For instance, the entity may include a processor programmed with instructions to implement the functions described. Still further, it should be understood that all of the discussion above is considered part of this detailed disclosure.

Referring to the drawings, as noted above, FIG. 1 is a simplified block diagram of a cellular wireless communication system in which the present method can be implemented. The system includes at its core a radio access network (RAN) 12 that functions to provide served mobile stations with communication service, such as access to one or more transport networks 14 for instance. As shown, the example RAN 12 includes one or more base stations (BSs) 16, one or more base station controllers (BSCs) 18, and one or more switches/gateways 20 providing connectivity with the transport network(s) 14. A suitable RAN can take other forms as well, ranging in degree of complexity and scope of operation.

Each base station preferably includes one or more antenna arrangements and associated equipment for radiating to define one or more sectors, in which mobile stations may operate. FIG. 1 depicts representative sectors 22-30 by way of example. These sectors may emanate from a common base station or may emanate from separate base stations, and the sectors preferably overlap with each other to facilitate handoff from one sector to another. In each sector, communications between the serving base station and served mobile stations may be compliant with one or more air interface protocols, such as any of those noted above for instance.

Shown operating in coverage of the RAN is an example mobile station 32. Mobile station 32 may be a cellular telephone, wirelessly equipped personal digital assistant or personal computer, wireless tracking device, or other wirelessly equipped device. Although the term "mobile station" is used by convention to describe such a device, it is understood that the device need not actually be movable. Mobile station 32 could in theory be fixed in position. In that case, the "movement" of mobile station 32 from one sector to another could be an idle or active handoff of mobile station 32 resulting from change in the relative air interface conditions of the two sectors or from other factors beyond mere physical movement of the device itself. Preferably, mobile station 32 has a unique identifier such as a mobile identification number (MIN), mobile directory number (MDN), international mobile subscriber identifier (IMSI), or the like, which can be used as a basis to target page messages to the mobile station and for other purposes.

In general, as discussed above, each sector 22-30 may operate on one or more frequency channels and may define a number of paging channels on which the RAN can transmit page messages targeted to specific mobile stations. Details of how these paging channels are defined will vary depending on air interface protocol will be understood by both the RAN and the served mobile stations so that the RAN can transmit a page message to a specific mobile station and the mobile station can receive and process the page message.

As one example, each paging channel may define periodically recurring timeslots for carrying page messages. When a mobile station monitors a paging channel in search of a page message, the mobile station may scan timeslots of the paging channel at a periodic interval defining a slot cycle, and the mobile station may determine whether the paging channel carries a page message indicating the mobile station's identifier. If so, the mobile station may then process the page message as a message destined to the mobile station.

Preferably in each sector, the serving base station will broadcast a specification of frequency channels used in the sector and, for each frequency channel, a specification of the paging channels defined in the sector, so that a mobile station beginning to operate in the sector can determine which frequency channel to use and, on that frequency channel, which paging channel to monitor.

By way of example, each sector may have a primary paging channel on each of its one or more frequency channels, and the base station may repeatedly broadcast on each primary paging channel a channel list message specifying the frequency channel(s) used in the sector. Once a mobile station detects a sufficiently strong pilot signal of the sector and decides to operate in the sector, the mobile station may then read the channel list message being broadcast on a primary paging channel of the sector so as to determine what frequency channels are in use in the sector. If more than one frequency channel is in use, as noted above, the mobile station may then apply a frequency channel hashing algorithm keyed to the mobile station's identifier, to select or "hash onto" a particular one of the frequency channels.

Further, the sector may broadcast on each frequency channel's primary paging channel a specification of the paging channels defined on the frequency channel. In some implementations, for instance, paging channels may be cardinally numbered, with each cardinal number corresponding to particular coding or another mechanism used to physically define the paging channel on the air interface. For instance, in CDMA systems, each paging channel may be defined by modulation with a respective Walsh code, and Walsh codes 1 through 7 may be reserved to define up to seven paging channels on a given frequency channel. With such an implementation, the broadcast specification of paging channels defined on a frequency channel may be a simple count of paging channels, such as a CDMA "NUM_PCH" value, indicating which cardinally numbered paging channels are in use. For instance, a NUM_PCH value of 3 may mean that paging channels 1, 2, and 3 are in use, whereas a NUM_PCH value of 5 may mean that paging channels 1, 2, 3, 4, and 5 are in use.

Once the mobile station has selected a frequency channel to use in the sector, the mobile station may then read the sector's specification of paging channels defined on that frequency channel. If more than one paging channel is defined, as noted above, the mobile station may then apply a paging channel hashing algorithm keyed to the mobile station's identifier, to select or hash onto a particular one of the paging channels to use. At that point, the mobile station may then operate in an idle mode, monitoring the selected paging channel for page messages.

In an example implementation, the RAN may also broadcast in each sector, such as on the primary paging channel of each frequency channel, a "neighbor list" that specifies nearby (e.g., adjacent) sectors to which a mobile station operating in the sector may be able to hand off. When a mobile station is idling in a given sector, the mobile station may thus regularly monitor the pilot signal strength in that sector as well as the pilot signal strength in each indicated neighbor sector (among possibly others), in an effort to identify a strongest sector on which to idle. Through this process, the mobile station may thereby determine that a given one of the indicated neighbor sectors has a stronger pilot strength (e.g., signal-to-noise ratio) than the mobile station's current sector, and the mobile station may engage in an idle handoff to that neighbor sector. Further, the mobile station may determine that multiple indicated neighbor sectors have a stronger pilot strength than the mobile station's current sector, and the mobile station may select the strongest of those sectors and engage in an idle handoff to that sector.

The idle handoff process may simply involve the mobile station discontinuing idle operation in its current sector and beginning to operate instead in the target neighbor sector. Thus, when engaging in this process in normal practice, the mobile station may go through the procedure noted above, including hashing onto a frequency channel in the target sector and then hashing onto a paging channel in the target sector, and at that point beginning to monitor for page messages on that paging channel.

A neighbor list that is broadcast on a frequency channel in a mobile station's current sector may further include a parameter respectively for each listed neighbor sector indicating whether the neighbor sector has the same number of frequency channels as the current sector and whether the neighbor sector has the same number of paging channels as the current sector (e.g., as the frequency channel on which the neighbor list is broadcast). For instance, the parameter may be a binary value such as 000 to indicate that the neighbor has the same number of frequency channels and the same number of paging channels, 001 to indicate that the neighbor has the same number of frequency channels but a different number of paging channels, or 010 to indicate that the neighbor has a different number of frequency channels and a different number of paging channels. This or other forms of parameters may be considered Boolean value indications of whether the neighbor sector has the same number of channels as the current sector.

If the parameter indicates that the neighbor has the same number of frequency channels and the same number of paging channels as the current sector, then if and when the mobile station hands off to that sector, the mobile station can forego the process of hashing onto a frequency channel and can also forego the process of hashing onto a paging channel. Rather, the mobile station can simply use the same frequency channel in the target sector that the mobile station was using in the current sector, and the mobile station can use the same paging channel in the target sector that the mobile station was using in the current sector. As the base station would presumably apply the hashing processes to reach the same result for the target sector as the mobile station reached in the current sector, the base station would be set to page the mobile station in the target sector on the paging channel that the mobile station is set to monitor in the target sector.

If the parameter indicates that the neighbor has same number of frequency channels but a different number of paging channels, then if and when the mobile station hands off to that sector, the mobile station can forego the process of hashing onto a frequency channel but can engage in a process of hashing onto a paging channel. Thus, the mobile station can use the same frequency channel in the target sector that the mobile station was using in the current sector, and the mobile station can apply a paging channel hashing algorithm to select a paging channel to monitor on that frequency channel. And again, the base station would presumably select the same frequency channel and paging channel on which to page the mobile station in the target sector.

If the parameter indicates that the neighbor has a different number of frequency channels and a different number of paging channels, then if and when the mobile station hands off to that sector, the mobile station would engage in process of hashing onto a frequency channel in the sector and would further engage in a process of hashing onto a paging channel in the sector. And here again, the base station would presumably apply the same hashing processes in order to select same paging channel on which to page the mobile station in the target sector.

As noted above, the present method seeks to minimize or avoid the delay resulting from hashing onto a paging channel when a mobile station engages in idle handoff, so as to reduce the likelihood that the mobile station will miss a page message transmitted to the mobile station in the target sector when the mobile station had not yet begun to monitor the paging channel in the target sector. The method achieves this by having the mobile station select a target sector based at least in part on a consideration of whether the target sector has the same number of channels as the mobile station's current sector.

In practice, the channels may be paging channels, such that the mobile station tries to select a target sector that has the same number of paging channels as the mobile station's current sector, thus helping to avoid the need for the mobile station to hash onto a paging channel. Further, the channels may be frequency channels such that the mobile station tries to select a target sector that has the same number of frequency channels and the same number of paging channels as the mobile station's current sector, thus helping to avoid the need for the mobile station to hash onto a frequency channel and to hash onto a paging channel.

Figure 2:
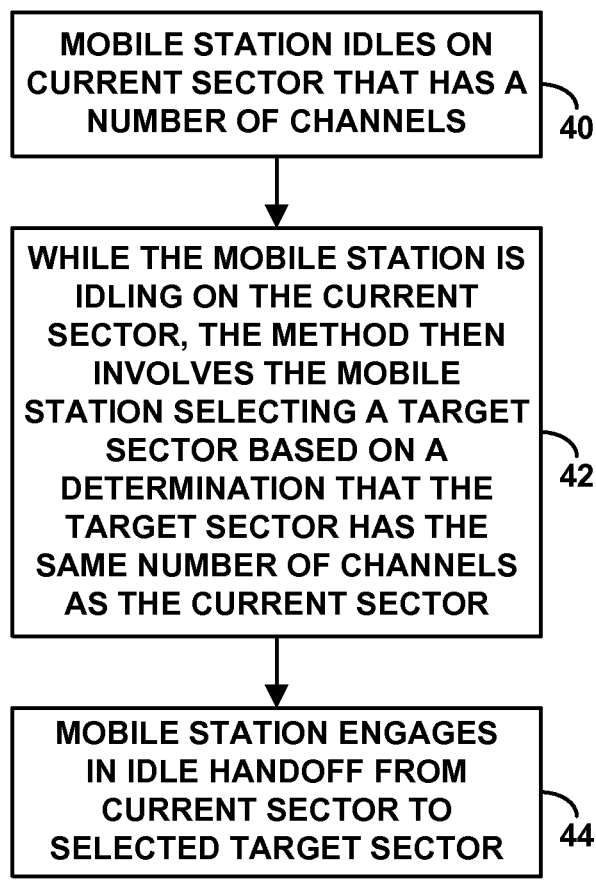
FIG. 2 is a flow chart depicting functions that can be carried out by a mobile station in accordance with the exemplary method.

FIG. 2 is a flow chart depicting functions that can be carried out in this process in practice, in accordance with an embodiment of the method. The method of FIG. 2 provides for idle handoff of a mobile station in a wireless communication system, where the wireless communication system has a plurality of sectors and each sector has a respective number of channels.

As shown in FIG. 2, at block 40, the method involves the mobile station idling on a current sector that has a number of channels. In the idle mode, as noted above, the mobile station would typically monitor a paging channel of the current sector for any relevant page messages, and the mobile station would have become aware of the number of channels defined in the current sector. Further, the mobile station may receive from the base station of the current sector a neighbor list that specifies neighbor sectors as potential handoff targets.

At block 42, while the mobile station is idling on the current sector, the method then involves the mobile station selecting a target sector based on a determination that the target sector has the same number of channels as the current sector. As noted above, this determination can be made by the mobile station evaluating data per sector in the neighbor list to identify as the target sector a neighbor sector that has the same number of channels as the current sector. In practice, as noted above, the channels at issue in this function may be paging channels and may further or alternatively be frequency channels.

This function of selecting a target sector based on a determination that the target sector has the same number of channels as the current sector may need to be based not only on the determination that the target sector has the same number of channels as the current sector but also a determination that the target sector is sufficiently strong to serve the mobile station.

To carry out this function in practice, the mobile station may thus filter the neighbor list to be limited to just those listed neighbor sectors that the neighbor list indicates have the same number of channels as the current sector, and the mobile station may then scan for a preferred sector as one that has the strongest pilot (e.g., the highest signal-to-noise ratio or other signal strength metric) and select that sector as the handoff target. Alternatively, the mobile station may first scan the sectors of the neighbor list to identify a set of potential handoff targets that are sufficiently strong (e.g., having threshold high enough signal-to-noise ratio or other signal strength metric), then filter the set of potential handoff targets to be limited to neighbor sectors that the neighbor list specifies as having the same number of channels as the current sector, and then select the target sector from the filtered set of potential handoff targets.

At block 44, the mobile station may then engage in an idle handoff from the current sector to the selected target sector. Optimally, if the mobile station has selected as the target sector a sector that has the same number of channels as the current sector, this idle handoff process may involve the mobile station quickly beginning to monitor the same numbered paging channel that the mobile station was monitoring in the current sector, without the need to hash onto that paging channel in the target sector, and thus without the mobile station engaging in such hashing. Further, engaging in the idle handoff process may involve other steps, such as registering with the RAN if appropriate (e.g., if the target sector is in a different paging zone than the current sector).

FIG. 3 is next a simplified block diagram of a mobile station, showing some of the components that such a device may include to facilitate implementation of the present method. As shown in FIG. 3, the mobile station includes a user interface 50, a wireless communication interface 52 with an antenna arrangement 54, a processing unit 56, and data storage 58, all of which may be communicatively linked together by a system bus, network, or other connection mechanism 60. Although the figure shows these components as discrete blocks, it should be understood that the components can be integrated together or distributed in various ways, and one or more components could be omitted altogether.

User interface 50 (if applicable for the mobile station at issue) includes components for receiving input from a user of mobile station and providing output to a user of the mobile station. Wireless communication interface 52 with antenna arrangement 54 functions to facilitate air interface communication with the RAN according to one or more protocols such as those noted above. Processing unit 56 may comprise one or more processors (e.g., general purpose and/or special purpose processors), such as microprocessors for instance and may be integrated with wireless communication interface 52, such as in the form of a processor embedded on a wireless communication chipset in the mobile station for instance. Data storage 58 may then comprise one or more volatile and/or non-volatile storage components, such as magnetic, optical, or organic storage components, and may be integrated in whole or in part with processor 56.

In this example arrangement, processing unit 56 may be arranged to select a target neighbor sector based on a determination that the target neighbor sector has the same number of channels as a current sector on which the mobile station is idling. For instance, processing unit 56 may be hard coded to implement such logic, or processing unit 56 may execute program instructions provided in data storage 54 to implement such logic.

Optimally, after the processing unit has selected a target neighbor sector based on a determination that the target neighbor sector has the same number of channels as a current sector on which the mobile station is idling, the mobile station may then engage in an idle handoff from the current sector to the selected target sector. To facilitate this, for instance, the processing unit 56 may be arranged in a manner similar to that described above to cause the mobile station to discontinue operation in the current sector and instead to begin operation in the selected target neighbor sector. Further, by striving to select as the target neighbor sector a sector that has the same number of channels as the current sector, the mobile station can advantageously avoid or minimize the need to engage in a hashing process to decide which channel to use, and the mobile station may thereby reduce the likelihood of missing a page message.

An exemplary embodiment of the present invention has been described above. Those of ordinary skill in the art will appreciate, however, that numerous changes may be made from the embodiment described without deviating from the scope of the invention as defined by the claims.

We claim:

1. A method for idle handoff of a mobile station in a wireless communication system, wherein the wireless communication system has a plurality of sectors and each sector has a respective number of channels, the method comprising:

the mobile station idling on a current sector having a number of channels, wherein the channels are paging channels;

while idling on the current sector, the mobile station selecting a target sector based on a determination that the target sector has the same number of channels as the current sector; and the mobile station engaging in an idle handoff from the current sector to the selected target sector, wherein the mobile station monitors a particular numbered paging channel from among the paging channels of the current sector, the method further comprising, upon handoff to the selected target sector, the mobile station monitoring the same particular numbered paging channel from among the paging channels of the target sector, without the mobile station going through a paging channel hashing process for the target sector.

2. A method for idle handoff of a mobile station in a wireless communication system, wherein the wireless communication system has a plurality of sectors and each sector has a respective number of channels, the method comprising:

the mobile station idling on a current sector having a number of channels, wherein the channels are paging channels;

while idling on the current sector, the mobile station selecting a target sector based on a determination that the target sector has the same number of channels as the current sector, wherein selecting the target sector based on a determination that the target sector has the same number of channels as the current sector comprises (i) reading from a neighbor list of the current sector a value that the neighbor list specifies for the target sector, the value indicating whether the target sector has the same number of channels as the current sector, (ii) making a determination that the value indicates the target sector has the same number of channels as the current sector, and (iii) selecting the target sector based on the determination; and the mobile station engaging in an idle handoff from the current sector to the selected target sector.

3. The method of claim 2, wherein the value is a Boolean value.

4. A mobile station operable in a wireless communication system, wherein the wireless communication system has a plurality of sectors and each sector has a respective number of channels, the mobile station comprising:

an antenna arrangement for engaging in air interface communication with the system; and a processing unit;

the processing unit being arranged to select a target neighbor sector based on a determination that the target neighbor sector has the same number of channels as a current sector on which the mobile station is idling, wherein the channels are paging channels, wherein the processing unit is arranged to receive via the antenna arrangement, from the current sector on which the mobile station is idling, a neighbor list that specifies a plurality of neighbor sectors and that includes respectively for each neighbor sector a specification of whether the neighbor sector has the same number of channels as the current sector, wherein the processing unit is further arranged to select the target sector from the plurality of neighbor sectors based on the specification of whether the target neighbor sector has the same number of channels as the current sector, and wherein the mobile station is arranged to engage in an idle handoff from the current sector to the selected target neighbor sector.

5. The mobile station of claim 4,
wherein the processing unit is further arranged to cause an idle handoff of the mobile station from the current sector to the selected target neighbor sector.

6. The mobile station of claim 4, wherein selecting the target sector from the plurality of neighbor sectors based on the specification of whether the target neighbor sector has the same number of channels as the current sector comprises:
   filtering the plurality of neighbor sectors to be limited to a set of neighbor sectors that each have the same number of channels as the current sector;
   scanning the neighbor sectors of the set to evaluate respective strength of each neighbor sector of the set; and
   selecting the target sector based on the scanning.

* * * * *